Patented Jan. 22, 1935

1,988,832

UNITED STATES PATENT OFFICE 1,988,832

PROCESS FOR BREAKING PETROLEUM EMULSIONS

Melvin De Groote, St. Louis, Mo., assignor to Tretolite Company, Webster Groves, Mo., a corporation of Missouri No Drawing. Application October 9, 1933, Serial No. 692,904

11 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottoms of oil storage tanks, and are commonly referred to as "Cut oil", "Roily oil", "Emulsified oil" and "Bottom settlings".

The object of my invention is to provide a novel, inexpensive and efficient process for separating emulsions of the kind referred to into their component parts of oil and water or brine.

Briefly described my process consists in subjecting a petroleum emulsion of the water-in-oil type, to the action of a treating agent or demulsifying agent of a particular kind or composition hereinafter described, thereby causing the emulsion to break down and separate into its component parts of oil and water or brine, when the emulsion is permitted to remain in a quiescent state after such treatment, or when subjected to other equivalent separatory procedure.

The treating agent or demulsifying agent used in my process consists of a substituted aromatic sulfonic acid in which a reactive hydroaromatic residue derived from a hydroaromatic alcohol or hydroaromatic hydrocarbon has been substituted in the aromatic nucleus. Such hydroaromatic residues, just like ordinary aliphatic residues, may be introduced into a sulfo-aromatic nucleus, or else the sulfonic group may be introduced into the aromatic nucleus simultaneously with the introduction of the hydroaromatic residue, or, if one desires, the aromatic compound, after introduction of the hydroaromatic residue, may be sulfonated. The processes employed for producing such chemical compounds are well known, being the same as the ones more frequently employed in the manufacture of similar products from aromatic compounds and either aliphatic alcohols or aliphatic hydrocarbons.

In manufacturing this type of reagent, one well known procedure is to convert an alcohol such as propyl alcohol or isopropyl alcohol, into propyl hydrogen sulfate. Said latter material is reacted with an aromatic compound, such as naphthalene, in the presence of an excess of a sulfonating agent, such as sulfuric acid. As a result, sulfuric acid reacts at a hydrogen of the aromatic nucleus to produce a sulfonic acid; and also a sulfuric acid molecule is split off when reaction occurs between the acid sulfate and another hydrogen of the nucleus, whereby a propyl radical or residue is introduced into the nucleus. Another procedure contemplates the passage of an olefine, such as propylene, into naphthalene sulfonic acid, or naphthalene, dissolved in an excess of sulfuric acid. Other reactions might involve the use of propyl chloride with the splitting of hydrochloric acid. The reactions involving introduction of a hydroaromatic residue are identical with those involving propyl alcohol or propylene. The treating agent contemplated by my process is one in which the residue introduced into the aromatic is derived from a reactive hydroaromatic of a kind to be subsequently described.

Hexahydrobenzene is the parent hydrocarbon of the hydroaromatic substances. Tetra and dihydrobenzene bear the same relationship to it, that an olefine and a diolefine show to the paraffin, having the same number of carbon atoms. Hexahydrobenzenes are the aromatic members of the cycloparaffins and are relatively inactive. However, certain hydroaromatic hydrocarbons, such as tetrahydrobenzene and the dihydrobenzene have a chemical activity comparable to the cyclo-olefines and the cyclo-diolefines. Such materials are considered as reactive hydroaromatic compounds or reactive hydroaromatic hydrocarbons. Indeed, hydroaromatic compounds, such as dihydrobenzene, may be so violently reactive that there is a tendency to polymerize in preference to entering the aromatic nucleus when dihydrobenzene is condensed with an aromatic, such as naphthalene. Just as propyl alcohol is reactive towards sulfuric acid, there are suitable hydroaromatic alcohols which will combine with sulfuric acid, and these are considered as being reactive. These reactive hydroaromatic alcohols may be condensed with an aromatic compound just as readily as a reactive hydroaromatic hydrocarbon of the olefine or diolefine type may be condensed therewith. Examples of such reactive hydroaromatic alcohols include cyclohexanol, methyl cyclohexanol, dimethylcyclohexanol, trimethylcyclohexanol, etc. Some of these hydroaromatic compounds appear in various isomeric forms. Substantially any isomeric form is suitable. Some of these hydroaromatic alcohols are produced by the hydrogenation of phenol, cresol, beta naphthol, etc.

The aromatic compound employed in producing the treating agent contemplated by my process may be monocyclic, such as benzene, toluene, xylene, etc., but is preferably polycyclic, such as naphthalene, anthracene, phenanthrene, methyl naphthalene, etc. There may be some other atom or group introduced into the aromatic compound, such as a chlorine atom, or a hydroxyl group, instead of one of the conventional hydrogen atoms. Thus, chlornaphthalene, or beta naphthol may be employed instead of naphthalene. The reagent contemplated is of the type R.T.HSO$_3$.R', in which R is the aromatic residue, T is a hydrogen atom thereof or a substituent group or atom, such as a hydroxyl group or a halogen atom, HSO$_3$ is the conventional sulfonic acid residue, and R' is the reactive hydroaromatic residue derived from a hydroaromatic olefine, such as cyclohexine C$_6$H$_{10}$, or a hydroaromatic diolefine, or a hydroaromatic alcohol. R may be derived from a monocyclic body, such as benzol or phenol, or, as previously stated, from a polycyclic material, such as naphthalene or hydroxy naphthalene.

The hydrogen of the sulfonic acid may be replaced by any suitable equivalent, such as a sodium, potassium, calcium, or magnesium atom; it may be replaced by an ammonium radical, or by a radical derived from a basic amine, such as triethanolamine. The hydrogen may be replaced by an organic radical, such as the ethyl group, etc. The formula above stated may be rewritten as R.T.Z.SO$_3$.R', in which the symbols have their previous significance and Z represents the hydrogen ion equivalent of the sulfonic acid, as previously described. Some of the reagents of this class are water-soluble; some are oil-soluble; some are soluble in both oil and water, and some are only sparingly soluble in either oil or water. Some of the reagents in water-soluble form, such as in the form of an ammonium salt, react with soluble calcium solutions and soluble magnesium solutions to produce precipitates. Such reagents, characterized by insoluble alkaline earth salts, appear to be most effective for breaking oil field emulsions and are preferable for use in the present process. The sulfonic acid body may contain more than one sulfo radical. Naphthalene disulfonic acid may furnish the aromatic nucleus. Possibly a sulfonic radical or other substituent member could be introduced into the hydroaromatic residue.

My preferred treating agent or demulsifying agent is obtained by mixing approximately 130 parts of naphthalene with approximately 100 parts of hexahydrophenol (sometimes referred to under the trade name of Hexalin), and adding approximately 400 parts of 66° Baumé sulfuric acid. The sulfuric acid is added slowly so that the reaction takes place within the limit of 60° to 90° centigrade. When the reaction is completed and the temperature has dropped to less than 30° C., approximately 500 parts of water are added and mixed in, so that the entire reaction mass is dissolved, or, is at least, homogeneous. This aqueous mixture is allowed to stand until a relatively complete separation takes place. The lower dilute acid layer is withdrawn. The upper acid mass may be used as such, or may be neutralized with various hydroxides, carbonates, etc. to give the salts previously mentioned. The water-soluble salts, such as the sodium salts, may be reacted with water-soluble iron salts, copper salts, etc. to give the corresponding heavy metal salt, by metathesis. Esters may be formed in the conventional manner. Triethanolamine may be used as the neutralizing agent. I prefer to neutralize the acidic mass with strong ammonium hydroxide. Such a reagent produces precipitates in the presence of soluble alkaline earth salts.

The above described materials may be employed as treating agents either alone or in combination with other recognized demulsifying agents, such as water softeners, modified fatty acids, salts of petroleum sulfonic acids, and the like.

The advantage or superiority of the reagent employed in my process is based on its ability to treat certain emulsions better than any other known reagent, and not on the basis that it can supersede the majority of modified fatty acids, sulfo fatty acids, etc. now used in the resolution of petroleum emulsions.

In practising my process, a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored; or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature varying from atmospheric temperature to about 200° F., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

The amount of treating agent that may be required to break the emulsion may vary from approximately 1 part of treating agent to 500 parts of emulsion, up to 1 part of treating agent to 20,000 or even 30,000 parts of emulsion. The proportion depends on the type of emulsion being treated, and also upon the equipment being used, and the temperature employed. In treating exceptionally refractory emulsions of the kind known as "tank bottoms" and "residual pit oils", the ratio of 1: 500, above referred to, may be required. In treating fresh emulsions, i. e., emulsions that will yield readily to the action of chemical demulsifying agents, the ratio of 1: 30,000, above referred to, may be sufficient to produce highly satisfactory results.

In general, I have found that for an average petroleum emulsion, a ratio of 1 part of treating agent to 10,000 parts of emulsion will usually be found to produce commercially satisfactory results.

Having thus described my invention, what I claim as new and desire to secure by Letters Patent is:

1. A process for breaking petroleum emulsions of the water-in-oil type, which consists in subjecting the emulsion to the action of a demulsifying agent containing a substituted aromatic sulfonic acid body of the type $R.T.ZSO_3.R'$, in which R is an aromatic residue, T is a hydrogen atom thereof or a substituent atom or a hydroxyl group, Z is the hydrogen ion equivalent of the sulfonic acid, $SO_3$ is the conventional sulfonic acid residue, and R' is a reactive hydroaromatic residue.

2. A process for breaking petroleum emulsions of the water-in-oil type, which consists in subjecting the emulsion to the action of a demulsifying agent containing a substituted aromatic sulfonic acid body of the type $R.T.ZSO_3.R'$, in which R is a monocyclic aromatic residue, T is a hydrogen atom thereof or a substituent atom or a hydroxyl group, Z is the hydrogen ion equivalent of the sulfonic acid, $SO_3$ is the conventional sulfonic acid residue, and R' is a reactive hydroaromatic residue.

3. A process for breaking petroleum emulsions of the water-in-oil type, which consists in subjecting the emulsion to the action of a demulsifying agent containing a substituted aromatic sulfonic acid body of the type $R.T.ZSO_3.R'$, in which R is a polycyclic aromatic residue, T is a hydrogen atom thereof or a substituent atom or a hydroxyl group, Z is the hydrogen ion equivalent of the sulfonic acid, $SO_3$ is the conventional sulfonic acid residue, and R' is a reactive hydroaromatic residue.

4. A process for breaking petroleum emulsions of the water-in-oil type, which consists in subjecting the emulsion to the action of a demulsifying agent containing a substituted aromatic sulfonic acid body of the type $R.T.ZSO_3.R'$, in which R is a bicyclic aromatic residue, T is a hydrogen atom thereof or a substituent atom or a hydroxyl group, Z is the hydrogen ion equivalent of the sulfonic acid, $SO_3$ is the conventional sulfonic acid residue, and R' is a reactive hydroaromatic residue.

5. A process for breaking petroleum emulsions of the water-in-oil type, which consists in subjecting the emulsion to the action of a demulsifying agent containing a substituted aromatic sulfonic acid body of the type $R.T.ZSO_3.R'$, in which R is a naphthalene residue, T is a hydrogen atom thereof or a substituent atom or a hydroxyl group, Z is the hydrogen ion equivalent of the sulfonic acid, $SO_3$ is the conventional sulfonic acid residue, and R' is a reactive hydroaromatic residue.

6. A process for breaking petroleum emulsions of the water-in-oil type, which consists in subjecting the emulsion to the action of a demulsifying agent containing a substituted aromatic sulfonic acid body of the type $R.T.ZSO_3.R'$, in which R is a naphthalene residue, T is a hydrogen atom thereof or a substituent atom or a hydroxyl group, Z is the hydrogen ion equivalent of the sulfonic acid, $SO_3$ is the conventional sulfonic acid residue, and R' is a reactive hydroaromatic residue, and being further characterized by being capable of forming a precipitate when reacted with a soluble alkaline earth salt.

7. A process for breaking petroleum emulsions of the water-in-oil type, which consists in subjecting the emulsion to the action of a demulsifying agent containing a substituted aromatic sulfonic acid body of the type $R.T.ZSO_3.R'$, in which R is the naphthalene residue $C_{10}H_5$, T is a hydrogen atom, Z is the hydrogen ion equivalent of the sulfonic acid, $SO_3$ is the conventional sulfonic acid residue, and R' is a reactive hydroaromatic residue derived from a hydroaromatic alcohol.

8. A process for breaking petroleum emulsions of the water-in-oil type, which consists in subjecting the emulsion to the action of a demulsifying agent containing a substituted aromatic sulfonic acid body of the type $R.T.ZSO_3.R'$, in which R is the naphthalene residue $C_{10}H_5$, T is a hydrogen atom, Z is the hydrogen ion equivalent of the sulfonic acid, $SO_3$ is the conventional sulfonic acid residue, and R' is a reactive hydroaromatic residue derived from cyclohexanol.

9. A process for breaking petroleum emulsions of the water-in-oil type, which consists in subjecting the emulsion to the action of a demulsifying agent containing a substituted aromatic sulfonic acid body of the type $R.T.ZSO_3.R'$, in which R is the naphthalene residue $C_{10}H_5$, T is a hydrogen atom, Z represents an ammonium radical, $SO_3$ is the conventional sulfonic acid residue, and R' is a reactive hydroaromatic residue derived from cyclohexanol.

10. A process for breaking petroleum emulsions of the water-in-oil type, which consists in subjecting the emulsion to the action of a demulsifying agent containing a substituted aromatic sulfonic acid body of the type $R.T.ZSO_3.R'$, in which R is the naphthalene aromatic residue $C_{10}H_5$, T is a hydrogen atom, Z represents an ammonium radical, $SO_3$ is the conventional sulfonic acid residue, and R' is a reactive hydroaromatic residue derived from cyclohexanol, and being further characterized by being capable of forming a precipitate when reacted with a soluble alkaline earth salt.

11. A process for breaking petroleum emulsions of the water-in-oil type, which consists in subjecting the emulsion to the action of a demulsifying agent produced by reacting molecular proportions of naphthalene and cyclohexanol with a large excess of strong sulfuric acid, followed by a washing process and a neutralization process by means of strong ammonia.

MELVIN DE GROOTE.